United States Patent
Lucas

(10) Patent No.: US 11,373,439 B1
(45) Date of Patent: Jun. 28, 2022

(54) TOUCHLESS FINGERPRINT MATCHING SYSTEMS AND METHODS

(71) Applicant: William Caleb Lucas, Birmingham, AL (US)

(72) Inventor: William Caleb Lucas, Birmingham, AL (US)

(73) Assignee: Telos Corporation, Ashburn, VA (US)

( * ) Notice: Subject to any disclaimer, the term of this patent is extended or adjusted under 35 U.S.C. 154(b) by 0 days.

(21) Appl. No.: 14/213,496

(22) Filed: Mar. 14, 2014

Related U.S. Application Data

(60) Provisional application No. 61/783,941, filed on Mar. 14, 2013.

(51) Int. Cl.
*G06V 40/12* (2022.01)
*G06V 40/13* (2022.01)

(52) U.S. Cl.
CPC .......... *G06V 40/1365* (2022.01); *G06V 40/13* (2022.01)

(58) Field of Classification Search
CPC ........... G06K 9/00006; G06K 9/00033; G06K 9/00087; G06K 9/00114; G06K 9/00093; G06K 9/00067; G06K 9/00885; G06K 9/4642; G06K 9/4647; G06K 9/00; G06K 9/46; G06K 9/6212; G06K 9/4671; G06K 9/54; G06K 9/0008; G06K 2009/00932; G06K 2009/0006; G06K 9/00228; G06F 17/30784; G06T 2207/20012; G06T 2207/10152; G06T 2207/20021; G06T 5/20; G06T 2207/20182; G06T 2207/20112; G06T 2207/20192;
(Continued)

(56) References Cited

U.S. PATENT DOCUMENTS

| | | | |
|---|---|---|---|
| 5,351,304 A | | 9/1994 | Yamamoto |
| 5,883,971 A | * | 3/1999 | Bolle ............... G06T 7/0002 382/124 |
| 5,909,501 A | | 6/1999 | Thebaud |

(Continued)

OTHER PUBLICATIONS

Hiew, Bee Yan, Andrew Beng Jin Teoh, and Ooi Shih Yin. "A secure digital camera based fingerprint verification system." Journal of Visual Communication and Image Representation 21, No. 3 (2010): 219-231.*

(Continued)

*Primary Examiner* — Carol Wang

(74) *Attorney, Agent, or Firm* — Maynard Cooper & Gale, P.C.; Jon E. Holland

(57) ABSTRACT

In order to authenticate a user of an electronic device, an image of the user's fingerprint is captured. Before feature information is extracted, the fingerprint image is enhanced via localized normalization thereby increasing contrast within the fingerprint image. Thereafter, feature information, such as key point data, is extracted from the image and compared to a predefined template to determine whether the feature information matches the template. If so, the user is authenticated. By enhancing the quality of the fingerprint image through localized normalization, the reliability of the matching operation is significantly enhanced. In addition, using key point comparisons for assessing similarity between the feature information and the template helps to address inconsistencies relating to finger rotation, scale, and translation during capture.

20 Claims, 5 Drawing Sheets

(58) Field of Classification Search
CPC ........... G06T 5/003; G06T 5/00; G06T 5/008; G06V 40/1365; G06V 40/13
See application file for complete search history.

(56) References Cited

U.S. PATENT DOCUMENTS

| | | | |
|---|---|---|---|
| 5,937,082 | A | 8/1999 | Funada |
| 6,111,978 | A * | 8/2000 | Bolle et al. .................. 382/125 |
| 6,744,910 | B1 | 6/2004 | McClurg |
| 7,020,591 | B1 | 3/2006 | Wei |
| 7,194,393 | B2 | 3/2007 | Wei |
| 9,165,177 | B2 | 10/2015 | Burcham |
| 2002/0126883 | A1 | 9/2002 | Senior |
| 2003/0076986 | A1 | 4/2003 | Yoon |
| 2003/0215118 | A1 | 11/2003 | Riff |
| 2004/0062427 | A1 | 4/2004 | Biswas |
| 2004/0228506 | A1 | 11/2004 | Haddad |
| 2004/0239648 | A1 | 12/2004 | Abdallah |
| 2004/0255168 | A1 * | 12/2004 | Murashita et al. ........... 713/202 |
| 2005/0185828 | A1 * | 8/2005 | Semba .................. G06V 40/12 382/124 |
| 2006/0115131 | A1 | 6/2006 | Wei |
| 2006/0233427 | A1 | 10/2006 | Hauke |
| 2007/0065009 | A1 * | 3/2007 | Ni ...................... G01S 7/52034 382/173 |
| 2007/0098254 | A1 * | 5/2007 | Yang .................. G06K 9/00369 382/159 |
| 2007/0230754 | A1 | 10/2007 | Jain |
| 2007/0297653 | A1 | 12/2007 | Bolle |
| 2009/0161964 | A1 * | 6/2009 | Tzur .................... G06K 9/3208 382/203 |
| 2009/0245597 | A1 | 10/2009 | Toyama |
| 2009/0268323 | A1 * | 10/2009 | Leong .................. G01N 21/211 360/31 |
| 2010/0315498 | A1 | 12/2010 | Choi |
| 2011/0064282 | A1 | 3/2011 | Abramovich |
| 2012/0016798 | A1 * | 1/2012 | Carper ........................... 705/43 |
| 2012/0076369 | A1 | 3/2012 | Abramovich |
| 2012/0086794 | A1 | 4/2012 | Burcham |
| 2012/0105586 | A1 | 5/2012 | Miesak |
| 2013/0058535 | A1 * | 3/2013 | Othmezouri ....... G06K 9/00369 382/103 |
| 2013/0100267 | A1 * | 4/2013 | Baek .................... G06V 10/993 348/E7.085 |
| 2014/0212008 | A1 | 7/2014 | Hatcher, II |
| 2015/0071508 | A1 * | 3/2015 | Boshra ................. G06F 3/0488 382/124 |
| 2015/0110367 | A1 | 4/2015 | Kumar |
| 2015/0130917 | A1 | 5/2015 | Mil'shtein |
| 2015/0146943 | A1 | 5/2015 | Son |
| 2015/0169934 | A1 | 6/2015 | Tsai |
| 2015/0227774 | A1 | 8/2015 | Balch |
| 2015/0294131 | A1 | 10/2015 | Neskovic |
| 2016/0098612 | A1 * | 4/2016 | Viviani .................. G06T 7/277 382/103 |

OTHER PUBLICATIONS

Zhou, Ru, SangWoo Sin, Dongju Li, Tsuyoshi Isshiki, and Hiroaki Kunieda. "Adaptive sift-based algorithm for specific fingerprint verification." In Hand-Based Biometrics (ICHB), 2011 International Conference on, pp. 1-6. IEEE, 2011.*

Feng, Jianjiang. "Combining minutiae descriptors for fingerprint matching." Pattern Recognition 41, No. 1 (2008): 342-352.*

Malathi, S., and C. Meena. "Partial fingerprint matching based on SIFT features." International Journal on Computer Science and Engineering 2, No. 04 (2010): 1411-1414.*

Hiew, B. Y., Andrew BJ Teoh, and Y. H. Pang. "Digital camera based fingerprint recognition." In Telecommunications and Malaysia International Conference on Communications, 2007. ICT-MICC 2007. IEEE International Conference on, pp. 676-681. IEEE, 2007.*

Dadgostar, M., Pooneh R. Tabrizi, Emad Fatemizadeh, and Hamid Soltanian-Zadeh. "Feature Extraction Using Gabor-Filter and Recursive Fisher Linear Discriminant with Application in Fingerprint Identification." In Advances in Pattern Recognition, 2009. ICAPR'09. Seventh International Conference on, pp. 217-220. IEEE, 2009.*

Kim, Byung-Gyu, Han-Ju Kim, and Dong-Jo Park. "New enhancement algorithm for fingerprint images." In Pattern Recognition, 2002. Proceedings. 16th International Conference on, vol. 3, pp. 879-882. IEEE, 2002.*

Kim, Joung-Youn, Lee-Sup Kim, and Seung-Ho Hwang. "An advanced contrast enhancement using partially overlapped sub-block histogram equalization." IEEE transactions on circuits and systems for video technology 11, No. 4 (2001): 475-484.*

Yang, Ju Cheng, Dong Sun Park, and Robert Hitchcock. "Effective enhancement of low-quality fingerprints with local ridge compensation." IEICE Electronics Express 5, No. 23 (2008): 1002-1009.*

Swiss Federal Institute of Technology Lausanne, Biomedical Imaging Group, "Local Normalization," Imaging Web Demonstration, Feb. 11, 2002, http://bigwww.epfl.ch/demo/jlocalnormalization/.

Rosten, et al., "Machine learning for high-speed corner detection," Department of Engineering, Cambridge University, UK, pp. 1-14, May 2006.

Rublee, et al., "ORB: an efficient alternative to SIFT or SURF," Willow Garage, pp. 1-8, Nov. 2011.

Kukharev, et al, "Visitor Identification—Elaborating Real Time Face Recognition System," Technical University of Szczecin, Faculty of Computer Science and Information Technology, pp. 1-8, Feb. 2004.

Chikkerur, et al., "A Systematic Approach for Feature Extraction in Fingerprint Images," Center for Unified Biometrics and Sensors (CUBS), University of Buffalo, pp. 1-7, Jul. 2004.

Hatcher, et al., U.S. Appl. No. 14/604,454, entitled, "Touchless Fingerprint Matching Systems and Methods," filed Jan. 23, 2015.

* cited by examiner

TOUCHLESS FINGERPRINT MATCHING SYSTEMS AND METHODS

CROSS REFERENCE TO RELATED APPLICATION

This application claims priority to U.S. Provisional Patent Application No. 61/783,941, entitled "Touchless Fingerprint Matching on Mobile Devices," and filed on Mar. 14, 2013, which is incorporated herein by reference.

RELATED ART

Data security is an important concern for mobile electronic devices, such as cellular telephones (e.g., iPhone®), laptop computers, tablet computers (e.g., iPad®), and personal digital assistants (PDAs). Such devices are often protected from unauthorized use through the use of password authentication. In this regard, before allowing a user to operate the device or an application on the device, the user is typically prompted for a password that must match a previously-stored password. If the passwords do not match, then the user is prevented from accessing electronic information or applications contained in the device until a matching password is successfully entered.

Password authentication has several drawbacks making its use less than ideal for many users. In this regard, a password is vulnerable to hackers who may improperly learn of a user's valid password in a number of ways thereby compromising the security of the information contained in the mobile device. Also, an authorized user is required to remember his password and may be undesirably prevented from accessing information or applications in the mobile device if he forgets his password. In addition, entering a password each time the user wishes to access sensitive information or applications is somewhat burdensome.

To address many of these drawbacks, other authentication techniques have been developed such as fingerprint authentication. In fingerprint authentication, an image of a user's finger is electronically captured to provide a fingerprint image that can be compared to a previously-stored template in order to authenticate the user. Fingerprint authentication is less vulnerable to hacking relative to other forms of authentication, such as password authentication, and can be more convenient for users. For example, a user may find that capturing an image of his finger is less burdensome than remembering and entering a password as is required for password authentication.

Unfortunately, fingerprint authentication has previously been plagued by performance issues that have prevented its widespread acceptance in the market, particularly for mobile devices. As an example, the face of a mobile device can be difficult to keep clean. If a user places his finger on the surface of a mobile device for image capture, the user's finger often leaves an oily residue that may adversely affect the quality of images captured in the future if the surface is not adequately cleaned. Also, during image capture, a user may press on the surface of the mobile device differently relative to other image captures, such that the user's fingerprint image is not consistent.

Touchless fingerprint authentication can alleviate several of the performance issues described above. In touchless fingerprint authentication, the user does not press his finger on a surface of the mobile device but rather positions his finger some distance away from the device's camera during image capture. Thus, the user's finger is not deformed during image capture since it is not pressed against a surface of the device helping to provide more consistent fingerprint images. Further, since the finger being imaged does not contact the device's surface, there is no oily residue that would otherwise affect future images captured by the device's camera.

However, touchless fingerprint authentication suffers from other drawbacks that make reliable matching difficult. Specifically, because the user's finger is not pressed against the surface of the mobile device, the lighting across the user's finger during capture may vary, depending on the lighting environment in which the image capture is occurring, thereby affecting the intensities and contrast measured by the mobile device. Further, the user's finger is likely to be positioned at different distances from the camera such that the depth of field varies from one image to the next. This variance in the depth of field makes it difficult to consistently capture a high quality image for matching purposes. In addition, the user's finger may be rotated from one image to the next making it difficult to consistently match fingerprint images of the same finger. Also, many fingerprint authentication algorithms are processing intensive, and the processing resources on many mobile devices are often limited.

Thus, a heretofore unaddressed need exists for improved fingerprint authentication techniques for addressing many of the drawbacks currently plaguing the performance and reliability of conventional fingerprint authentication algorithms.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to touchless fingerprint matching for use in fingerprint authentication. In order to authenticate a user of an electronic device, an image of the user's fingerprint is captured. Before feature information is extracted, the fingerprint image is enhanced via localized normalization thereby increasing contrast within the fingerprint image. Thereafter, feature information, such as key point data, is extracted from the image and compared to a predefined template to determine whether the feature information matches the template. If so, the user is authenticated. By enhancing the quality of the fingerprint image through localized normalization, the reliability of the matching operation is significantly enhanced. In addition, using key point comparisons for assessing similarity between the feature information and the template helps to address inconsistencies relating to finger rotation, scale, and translation during capture.

Figure 1:
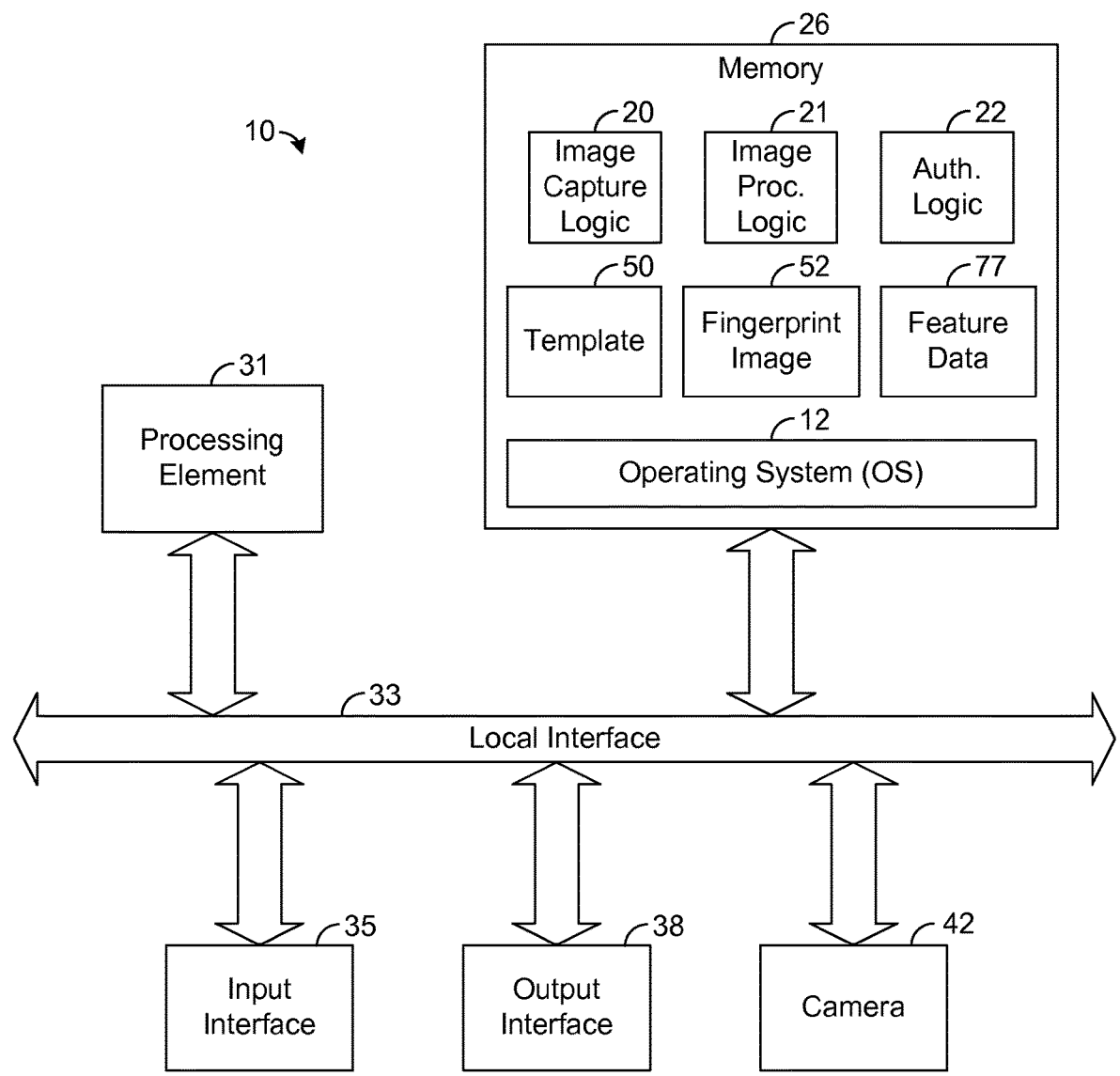
FIG. 1 is a block diagram illustrating an exemplary embodiment of an electronic device for performing touchless fingerprint authentication.

FIG. 1 depicts an exemplary embodiment of an electronics device 10 that is configured to perform touchless fingerprint authentication, as will be described in more detail hereafter. As an example, the electronics device 10 may be a mobile device, such as a cellular telephone, laptop computer, table computer, PDA, or any other mobile electronics device having resources, such as applications or sensitive data, for which access is to be restricted. In other embodiments, it is unnecessary for the device 10 to be mobile. As an example, the electronics device 10 may be a desktop computer or a wall-mounted security device for controlling access (e.g., controlling door locks) to rooms or certain restricted areas.

As shown by FIG. 1, the device 10 has an operating system 12 that is implemented in software or firmware for generally controlling and managing resources of the device 10. The device 10 also has image capture logic 20, image processing logic 21, and authentication logic 22 for generally capturing one or more fingerprint images and authenticating at least one user based on the captured fingerprint images, as will be described in more detail hereafter. The image capture logic 20, the image processing logic, and the authentication logic 22 can be implemented in software, hardware, firmware or any combination thereof. In the exemplary embodiment illustrated by FIG. 1, the image capture logic 20, the image processing logic 21, and the authentication logic 22 are implemented in software and stored in memory 26 of the device 10.

Note that the image capture logic 20, the image processing logic 21, and the authentication logic 22, when implemented in software, can be stored and transported on any computer-readable medium for use by or in connection with an instruction execution apparatus that can fetch and execute instructions. In the context of this document, a "computer-readable medium" can be any means that can contain or store a computer program for use by or in connection with an instruction execution apparatus.

The exemplary device 10 depicted by FIG. 1 comprises at least one conventional processing element 31, such as a digital signal processor (DSP) or a central processing unit (CPU), that communicates to and drives the other elements within the device 10 via a local interface 33, which can include at least one bus. As an example, the processing element is configured to retrieve and execute instructions of software stored in memory 26. Furthermore, an input interface 35, for example, a keyboard, a keypad, or a mouse, can be used to input data from a user of the device 10, and an output interface 38, for example, a printer, monitor, liquid crystal display (LCD), or other display apparatus, can be used to output data to the user. In one exemplary embodiment, the device 10 has a touchscreen, which can be used to implement the input interface 35 and the output interface 38. In this regard, the touchscreen is configured to display information to the user and also accept inputs from the user, via capacitive sensing or otherwise, when the user touches the touchscreen. As shown by FIG. 1, the device 10 also has a camera 42 for capturing images, as will be described in more detail below.

Note that the device 10 may have components and resources not specifically shown in FIG. 1. For example, when the device 10 is implemented as a cellular telephone, the device 10 may have a microphone for converting sounds (e.g., speech) into digital data and a speaker for converting digital data into sound. The device 10 may also have a transceiver and an antenna for wirelessly communicating data (e.g., cellular signals).

At certain times, such as after power up or after a user has submitted an input indicating a desire to access a particular resource, such as sensitive data or applications stored in the device 10, the device 10 is configured to authenticate the user before permitting the user access to the resource. In this regard, the image capture logic 20 is configured to capture a fingerprint image of the user, and the image processing logic 21 is configured to process the captured image in order to improve and enhance image quality and contrast within the image. The image processing logic 21 is also configured to extract feature descriptors indicative of the user's fingerprint. The authentication logic 22 is configured to then compare data defining the feature descriptors to a template 50 that is indicative of the fingerprint of an authorized user. In this regard, the authentication logic 22 is configured to determine whether there is a sufficient correlation between the feature descriptors extracted from the captured fingerprint image and the template 50 such that the identity of the user from which the fingerprint image was captured is deemed to match the identity of the user from which the template 50 was originally derived. In particular, the authentication logic 22 determines a score, referred to herein as "correlation score," indicating the extent to which the feature descriptors from the processed fingerprint image correlates with the template 50. In general, the more similar the feature descriptors are to the template 50, the higher is the correlation score.

If the correlation score exceeds a predefined threshold, then the data defining the feature descriptors is deemed to "match" the template 50 such that the user is deemed to be authenticated as an authorized user of the device 10. In this regard, matching of the data defining the feature descriptors to the template 50 indicates that the newly-acquired fingerprint image is sufficiently similar to ("matches") the fingerprint image from which the template 50 was derived such that the user can be deemed to be the same person who provided the template 50. In such case, the device 10 (e.g., operating system 12) permits the user to access resources of the device 10 that would otherwise be restricted from access or use. As an example, the operating system 12 may permit the user to run an application (not shown) or view sensitive data that the user otherwise would not be permitted to access in the absence of a matching fingerprint image.

Figure 2:
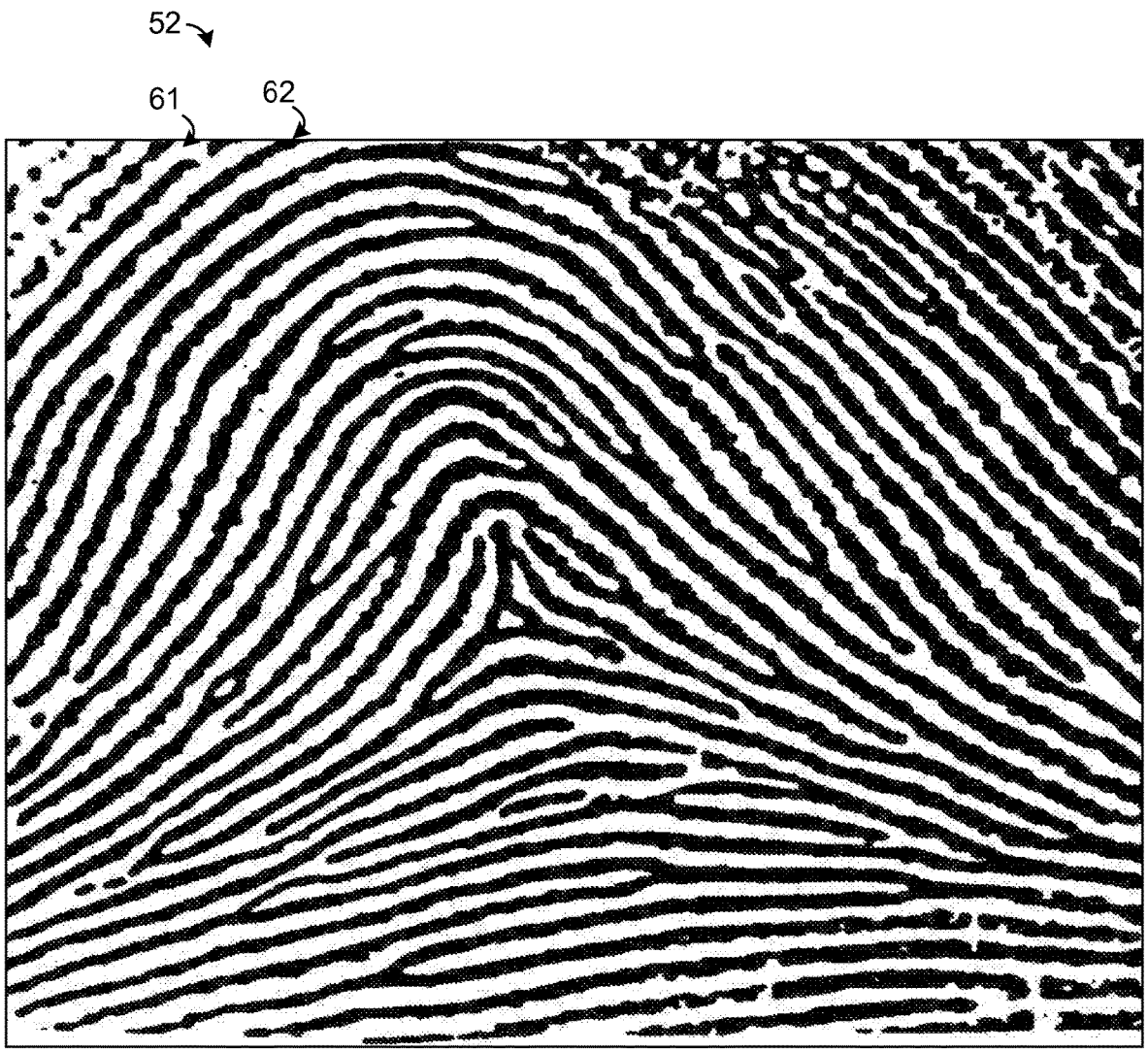
FIG. 2 depicts an exemplary fingerprint image captured by the electronic device depicted by FIG. 1.

Note that the template 50 is defined during a registration phase in which an authorized user provides a fingerprint image. In this regard, the user places a finger some distance (e.g., about four to six inches, though other distances are possible) away from the camera 42 (where the finger 10 is in free space and, specifically, is not touching the device 10) and provides an input via the input interface 35 indicating that the user is ready for the device 10 to capture an image of his fingerprint. In response, the image capture logic 20 controls the camera 42 such that it captures an image of the user's fingerprint. The image capture logic 20 is configured to filter and analyze the image in order to locate the user's fingertip within the image. The image capture logic 20 then crops the image so that the remaining image is entirely that of the user's fingerprint. FIG. 2 depicts an exemplary cropped fingerprint image 52.

Note that the fingerprint image 52 is defined by pixel data, as is known in the art. In this regard, the fingerprint image 52 is defined by rows and columns of pixels in which each pixel represents a discrete area of the image 52. Each pixel has a color value and an intensity value indicating the color and intensity, respectively, for the discrete area represented by the pixel.

As illustrated by FIG. 2, the fingerprint image 52 is characterized by ridges 61 (indicated as white in FIG. 2) and valleys 62 (indicated at black in FIG. 2), which are arranged in a pattern unique to the user from which the image 52 was captured. The captured image 52 is processed by the image processing logic 21 (FIG. 1) in order to enhance the quality of the image 52 and to extract feature descriptors that can be used to define the template 50, as will be described in more detail below.

In one exemplary embodiment, the image processing logic 21 is configured to digitally enhance the fingerprint image 52 by filtering and normalizing the image 52 using conventional filtering and normalization algorithms in an effort to improve the contrast within the image 52. In this regard, many conventional normalization algorithms calculate the standard deviation and mean of a given set of values (e.g., intensity values) of an image and adjust each individual intensity value based on the standard deviation and mean calculated by the algorithm.

In touchless fingerprint authentication, the imaged finger is likely illuminated by light at varying brightness across the width of the finger. In this regard, different areas of the fingertip are likely illuminated differently such that one portion of the fingertip may appear to be brighter than another portion. Such varying light conditions across the surface of the finger can have an adverse effect on contrast. In one exemplary embodiment, the image processing logic 21 is configured to compensate for effects of varying light conditions by performing localized normalization on the fingerprint image 52.

In this regard, "global normalization" refers to a normalization process in which a set of normalization parameters, such as standard deviation and mean, are calculated based on all of the pixels of an image, and all of the pixels are normalized based on these normalization parameters. In "localized normalization," as that term is used herein, an image is segmented into multiple windows, wherein each window includes a subset of the pixels of the entire image. In some embodiments, the windows are overlapping such that the pixels close to an edge of one window are also included in an adjacent window, but it is unnecessary for the windows to be overlapping in other embodiments. Rather than calculating a single set of normalization parameters for the entire image, a different set of normalization parameters is calculated for each window based on the pixel values in the respective window. Such normalization values are then used to adjust the pixel values on a window-by-window basis such that the pixel values in each window are separately normalized based on a different set of normalization parameters relative to the pixels of other windows.

Figure 3:
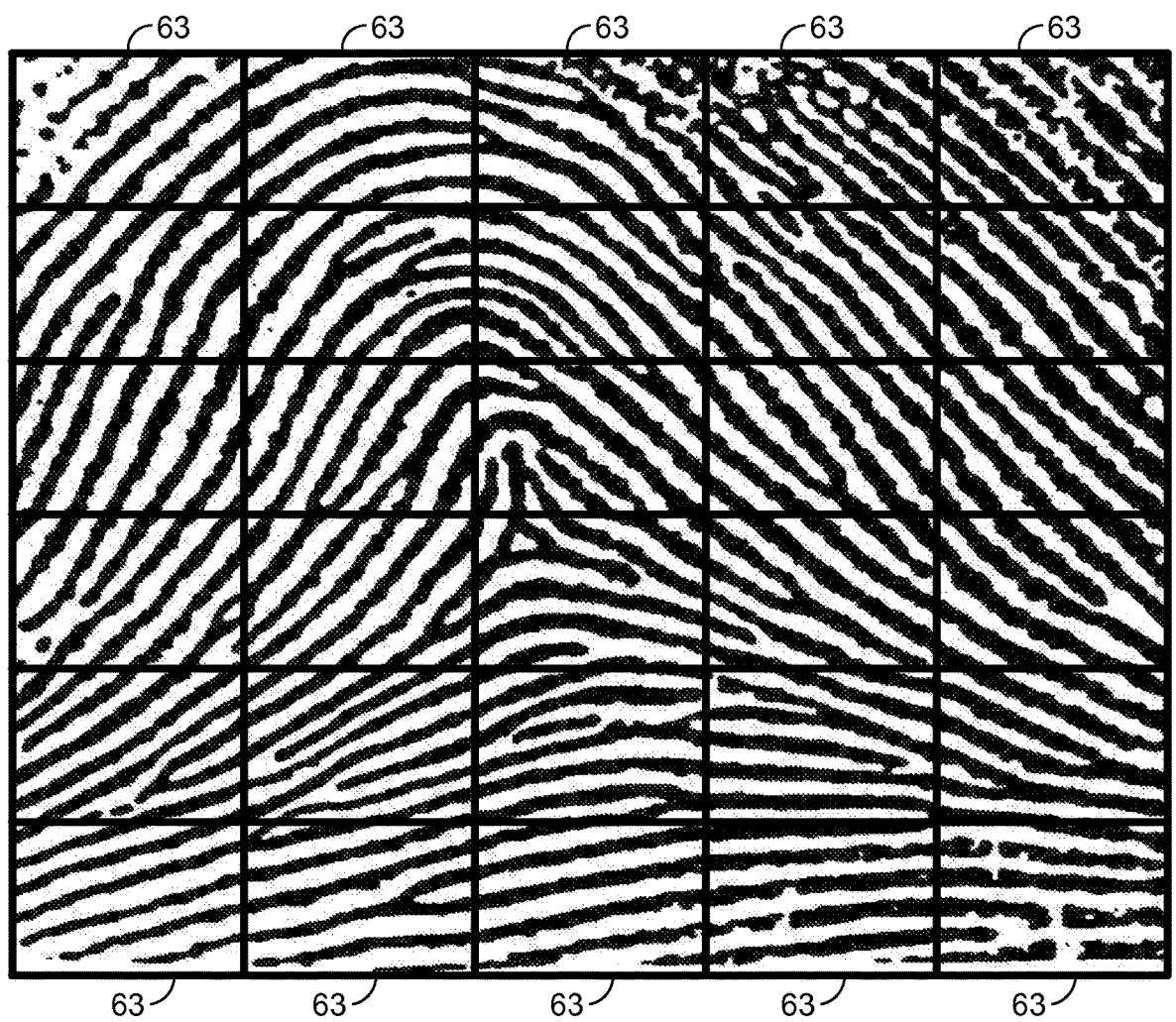
FIG. 3 depicts the fingerprint image of FIG. 2 after the fingerprint image has been segmented for localized normalization.

To better illustrate the foregoing, refer to FIG. 3. In this regard, the image processing logic 21 is configured to segment the fingerprint image 52 into a plurality of windows 63. For each window 63, the image processing logic 21 is configured to calculate a new set of normalization parameters, such as a standard deviation value and a mean value, based on the intensity values of the pixels within the window 63. After calculating such normalization parameters, the image processing logic 21 then adjusts the intensity values of the pixels in the same window 63 according to the normalization parameters. As an example, in one exemplary embodiment, for each intensity value in the same window 63, the image processing logic 21 is configured to subtract the intensity value by the window's mean value and divide such difference by the window's standard deviation value. Note that, in other embodiments, other normalization algorithms and parameters may be used.

Accordingly, the intensity values in each window 63 are normalized based on the normalization parameters that are uniquely calculated for such window 63. After normalizing a given window 63, the image processing logic 21 is configured to normalize the next window 63 in the same way using normalization parameters that are calculated from the intensity values in such next window 63. The normalization process is repeated for each window 63 until all of the windows 63 in the image 52 have been normalized.

By using a localized normalization algorithm, it is more likely that the intensity values that are normalized together (i.e., based on the same normalization parameters) represent an area of the user's finger that is illuminated with a similar brightness across the width of the area. That is, the lighting conditions are likely to vary less across the width of a smaller window 63 relative to the width across the entire image 52. Thus, the localized normalization algorithm is likely more effective at enhancing the contrast within the image 52 relative to a global normalization algorithm.

After normalization, the image processing logic 21 is configured to extract feature descriptors from the image 52 and store such feature descriptors in memory 26 as the template 50 that is to be later used for authenticating fingerprint images captured by the device 10, as will be described in more detail below. Note that there are various algorithms that can be used to extract feature descriptors. For example, there are various conventional fingerprint authentication algorithms that detect fingerprint features, commonly referred to as "minutiae," and use such minutia in comparisons between fingerprint images for determining whether one image matches another. Such algorithms and/or other known fingerprint comparison algorithms may be employed by the image processing logic 21 for determining the feature descriptors, which in this embodiment describe the minutiae detected for the fingerprint image 52.

In one exemplary embodiment, the image processing logic 21 is configured to use a key point detection algorithm in order to detect key points within the fingerprint image 52. A key point detection algorithm generally analyzes the intensity values of an image to detect points of features within the image. In this regard, a "key point" generally refers to a point in the image where the intensity value abruptly changes relative to other points in the immediate vicinity or close to the key point. That is, a key point generally refers to a point where the change in intensity from neighboring points is greater than a predefined threshold indicating that a boundary of a corner or some other feature is likely located at or close to the key point. Such key point algorithms in the past have been used for finding key points in overlapping images so that the images can be stitched together, such as when taking a panoramic image of a scene.

Figure 4:
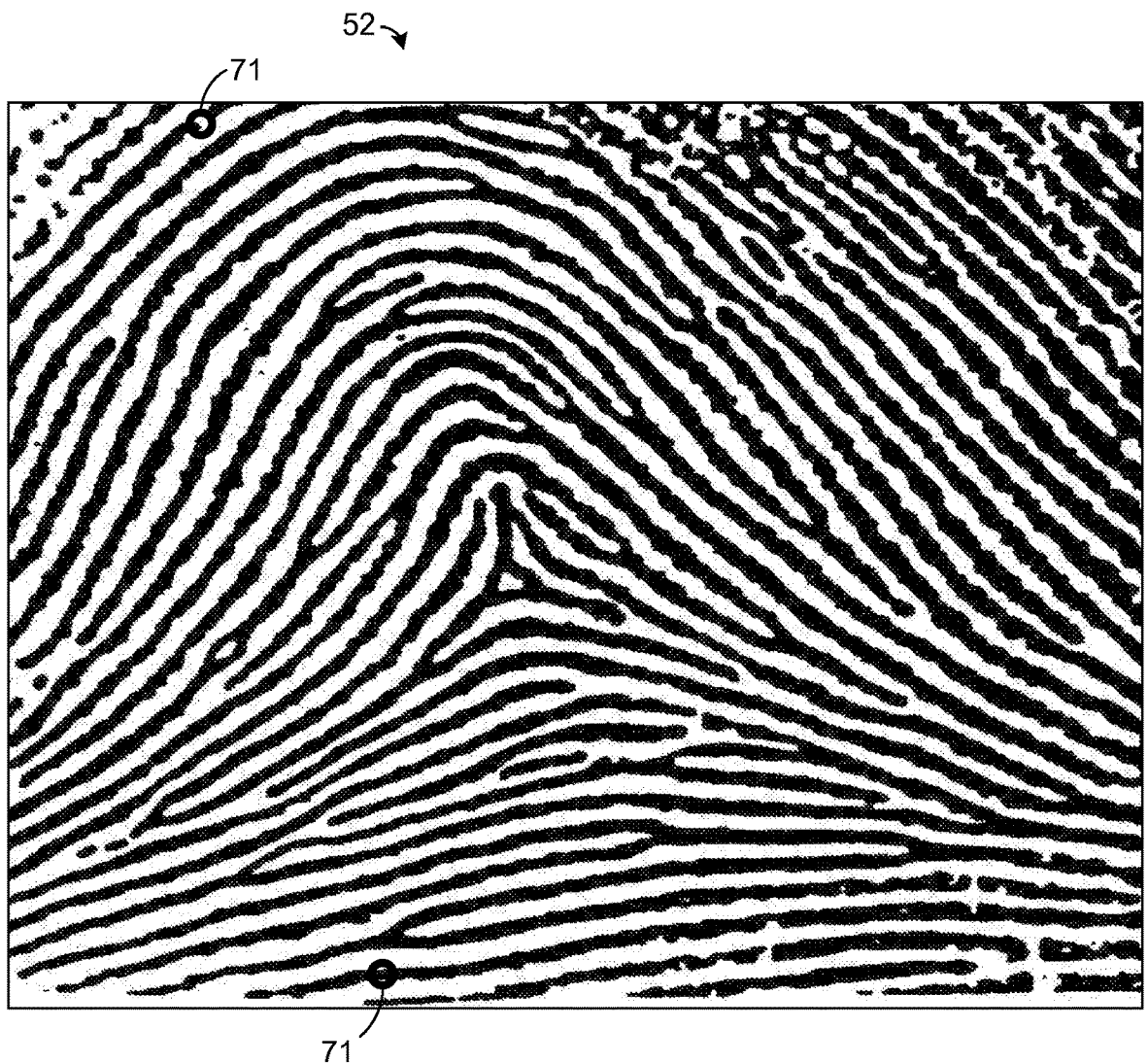
FIG. 4 depicts the fingerprint image of FIG. 2 with key points indicated in the fingerprint image for illustrative purposes.

In the instant embodiment, such a key point detection algorithm, such as the Features from Accelerated Segment Test (FAST) corner detection method, is used to locate key points 71 within the image 52, as shown by FIG. 4. Note that FIG. 4 shows two key points 71 for simplicity of illustration. However, in a given fingerprint image 52, the image processing logic 21 may locate any number, such as several thousand, of key points 71 depending on intensity patterns in the image 52.

Figure 5:
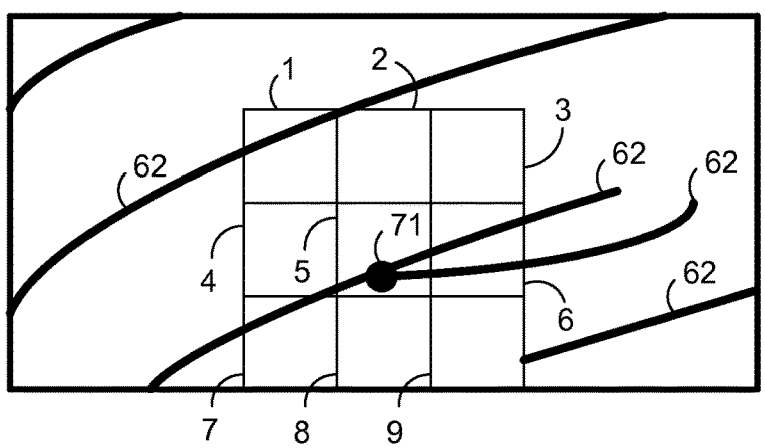
FIG. 5 depicts a portion of a fingerprint image, such as is depicted by FIG. 4, having a key point and, for illustrative purposes, shows pixels that are used for characterizing the key point.

For each identified key point 71, the image processing logic 21 is configured to characterize the key point 71 by defining a data structure (e.g., an array), referred to as a "feature descriptor," indicative of pixel values close to the key point. In one exemplary embodiment, the feature descriptor includes intensity values from adjacent pixels surrounding the key point 71. As an example, a key point 71 in FIG. 5 is shown as surrounded by nine adjacent pixels 1-9 representing a small window of pixels, wherein the window includes the location of the key point. The feature descriptor for such key point may have nine intensity values (i.e., one intensity value for each pixel 1-9). In one exemplary embodiment, the number of adjacent pixels used to characterize each key point 71 is selected between 5 and 15, although other numbers of pixels may be used to characterize a key point 71 in other embodiments. The feature descriptors of the identified key points 71 are stored in memory 26 as the template 50. In one exemplary embodiment, the feature descriptors are computed using the Oriented Binary Robust Independent Elementary Features ("Oriented BRIEF") method.

At this point, the fingerprint image 52 may be discarded. Thus, it is not necessary for the fingerprint image 52 to be permanently stored in memory 26 to enable authentication. That is, the feature descriptors may be used to authenticate fingerprint images without the need to retain an actual fingerprint image 52 in memory 26. This helps to prevent unauthorized access to the user's fingerprint image 52 in the event that a hacker somehow gains access to the device 10.

After the template 50 has been defined, fingerprint authentication may be performed as may be desired. In this regard, when user authentication is desired, the image capture logic 20 is configured to capture an image 52 of a user's fingerprint via the camera 42, as described above and shown by block 111 of FIG. 6. Further, this fingerprint image 52 is processed in the same way as described above in order to extract feature descriptors from the fingerprint image 52. As an example, the image processing logic 21 is configured to perform a localized normalization on the captured fingerprint image, as described above and shown by block 115 of FIG. 6, thereby enhancing contrast within the fingerprint image. The logic 21 then extracts feature information, such as the feature descriptors described above, as shown by block 118 of FIG. 6, by identifying key points in the fingerprint image and then characterizing each identified key point with an array of intensity values representing the adjacent pixels surrounding the identified key point. Such feature descriptors for the same fingerprint image are stored in memory 26 as a set of key point data 77.

Figure 6:
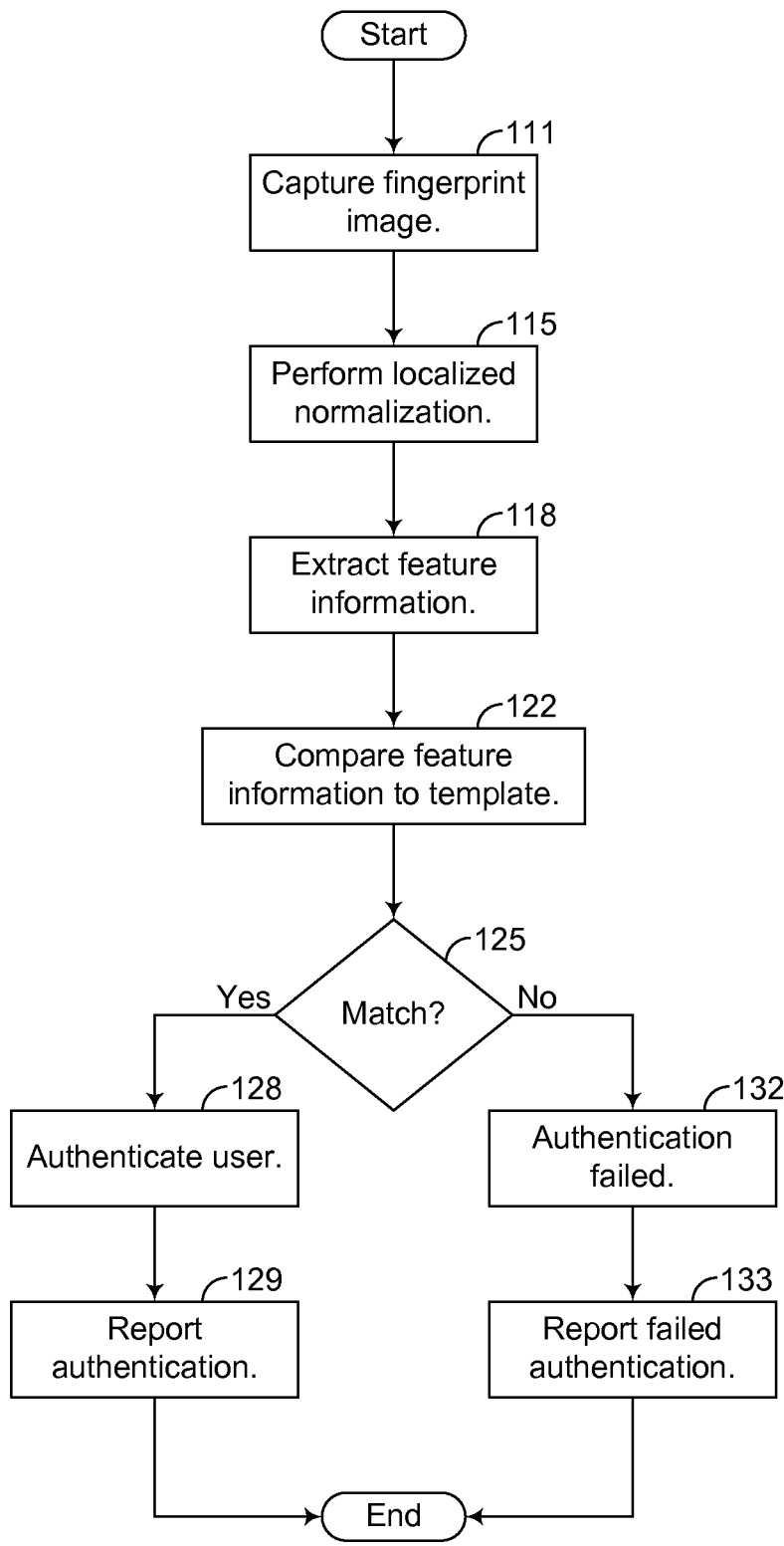
FIG. 6 is a flowchart illustrating an exemplary method for authenticating a user of an electronics device, such as is depicted by FIG. 1.

After the key point data 77 is defined, the authentication logic 22 is configured to compare the key point data 77 (specifically the feature descriptors extracted in block 118) to the template 50 to determine whether the key point data 77 matches the template 50, as shown by blocks 122 and 125 of FIG. 6. That is, the logic 22 compares each feature descriptor of the key point data 77 to the feature descriptors of the template 50 to determine which of the feature descriptors of the key point data 77 match a respective feature descriptor of the template 50. A feature descriptor is deemed to match another feature descriptor if the difference in the intensity values of the two vectors is below a predefined threshold. In one exemplary embodiment, each feature descriptor is treated as a distance vector, where each intensity value represents a component of the distance vector, and the Hamming distance between the feature descriptors is calculated and compared to a threshold. If the Hamming distance is below a predefined threshold, then the feature descriptors are determined to match. If not, no match is detected.

In one exemplary embodiment, the authentication logic 22 is configured to calculate a correlation score by counting the number of feature descriptors in the key point data 77 that are determined to match feature descriptors in the template 50. Thus, a higher number of descriptor matches results in a higher correlation score. If the correlation score exceeds a predefined threshold, then the newly-acquired fingerprint image is deemed to match the original fingerprint image from which the template 50 was derived. In such case, the authentication logic 22 is configured to authenticate the user and report the authentication to the operating system 12 or other component, as shown by blocks 128 and 129 of FIG. 6. As an example, the logic 22 may transmit a message to the operating system 12 indicating that a match was found for the newly-acquired fingerprint image. In response, the operating system 12 may permit the user provide inputs for accessing resources of the device 10 that would otherwise be restricted from access. In addition, the authentication logic 22 is also configured to display, via the output interface 38, a message indicating the authentication attempt was successful.

If the correlation score does not exceed the predefined threshold, then the authentication logic 22 is configured to determine that the authentication failed and to report the failed authentication attempt, as shown by blocks 132 and 133 of FIG. 6. As an example, the logic 22 may transit a message to the operating system 12 indicating that a match was not found for the newly-acquired fingerprint image. In response, the operating system 12 may prevent the user from accessing one or more resources of the electronics device 10, such as applications or sensitive data stored in the device 10, until an authentication attempt is successfully performed. In addition, the authentication logic 22 is also configured to display, via the output interface 38, a message indicating that the authentication attempt was not successful.

Note that the use of a key point detection algorithm, as described above, to extract feature descriptors from the fingerprint images may have advantages for touchless fingerprint algorithms relative to other types of feature extraction algorithms. In this regard, the key point detection algorithm can yield a successful matching decision, according to the matching techniques described herein, even when the user's finger is significantly rotated in the fingerprint image being authenticated relative to the original fingerprint image used to define the template 50. When the user's finger is so rotated, a portion of the user's fingerprint may be missing from the fingerprint image 52 that is being compared to the template 50. For key points in the missing portion of the fingerprint image, there will be no matches. However, as long as there is at least a portion of the fingerprint image 52 corresponding to a portion of the original fingerprint image from which the template 50 was derived, there should be at least some key point matches counted by the authentication logic 22. In such case there may be enough key point matches to reliably authenticate the user even though the user's finger is significantly rotated.

Now, therefore, the following is claimed:

1. An electronics device for performing touchless fingerprint authentication, comprising:
   memory for storing a template indicative of a fingerprint, wherein the template includes template feature information obtained from a template fingerprint image;
   a camera configured to capture a fingerprint image of a finger while the finger is positioned away from the camera by a distance; and
   at least one processor configured to perform localized normalization on the fingerprint image for compensating for varying lighting conditions across a surface of the finger, the at least one processor configured to analyze intensity values of the fingerprint image for determining feature information indicative of fingerprint features in the fingerprint image, the at least one processor further configured to compare the feature information to the template for determining whether the feature information matches the template and to determine whether to authenticate a user associated with the fingerprint image based on whether the feature information is determined to match the template, wherein the template fingerprint image is discarded by the at least one processor after obtaining the template feature information from the template fingerprint image and before comparing the feature information to the template, and wherein the at least one processor in performing the localized normalization is configured to:

segment the fingerprint image into a plurality of windows, including at least a first window and a second window;

determine a first normalization parameter based on intensity values within the first window;

determine a second normalization parameter based on intensity values within the second window;

adjust the intensity values within the first window based on the first normalization parameter independently of each of the other windows of the plurality of windows; and adjust the intensity values within the second window based on the second normalization parameter independently of each of the other windows of the plurality of windows.

2. The device of claim 1, further comprising an output interface, wherein the at least one processor is configured to display via the output interface a message indicating whether the user is authenticated based on the fingerprint image.

3. The device of claim 1, wherein the feature information comprises feature descriptors describing key points identified within the fingerprint image.

4. The device of claim 3, wherein the at least one processor is configured to count a number of the feature descriptors in the feature information that match feature descriptors in the template.

5. The device of claim 3, wherein one of the feature descriptors is indicative of intensity values for adjacent pixels surrounding one of the identified key points, and wherein the at least one processor is configured to compare the one feature descriptor to the template for determining whether the one feature descriptor matches a feature descriptor indicated by the template.

6. The device of claim 5, wherein the at least one processor is configured to count a number of the feature descriptors in the feature information that match feature descriptors in the template.

7. The device of claim 1, wherein the at least one processor is configured to detect a plurality of key points in the fingerprint image, wherein the at least one processor for each of the plurality of key points is configured to characterize the key point by defining a feature descriptor that includes intensity values from pixels adjacent to the key point, thereby defining a plurality of feature descriptors for the key points, wherein the feature information includes the plurality of feature descriptors, and wherein the at least one processor is configured to compare the plurality of feature descriptors to the template.

8. The device of claim 7, wherein the at least one processor is configured to determine a score based on a number of the plurality of feature descriptors that respectively match feature descriptors in the template, wherein the at least one processor is configured to compare the score to a threshold, and wherein the at least one processor is configured to authenticate the user based on a comparison of the score to the threshold.

9. The electronics device of claim 1, wherein the first window overlaps with the second window.

10. The device of claim 1, wherein the at least one processor is configured to identify a fingertip of the user in the fingerprint image and to crop the fingerprint image such that the cropped fingerprint image is entirely of the fingerprint of the user, and wherein the at least one processor is configured to perform the localized normalization on the cropped fingerprint image.

11. The device of claim 1, wherein the first normalization value is a mean value of the intensity values within the first window, and wherein the at least one processor, in performing the localized normalization, is configured to:

determine a standard deviation value of the intensity values within the first window; and for each of the intensity values within the first window, subtract the respective intensity value by the mean value, thereby generating a difference value, and divide the difference value by the standard deviation value.

12. The device of claim 1, wherein each window of the plurality of windows overlaps with an adjacent window along an edge of the respective window of the plurality of windows such that pixels close to the edge are included in both of the overlapping windows.

13. A touchless fingerprint authentication method for use with an electronics device, comprising:

obtaining template feature information from a template fingerprint image;

storing, in memory, a template indicative of a fingerprint, wherein the template includes the template feature information;

capturing a fingerprint image of a finger with a camera of the electronics device while the finger is positioned away from the camera by a distance;

performing localized normalization on the fingerprint image with the electronics device for compensating for varying lighting conditions across a surface of the finger, wherein the performing comprises: segmenting the fingerprint image into a plurality of windows, determining a first normalization parameter for a first window of the plurality of windows based on intensity values within the first window, determining a second normalization parameter for a second window of the plurality of windows based on intensity values within the second window, adjusting the intensity values within the first window based on the first normalization parameter independently of each of the other windows of the plurality of windows, and adjusting the intensity values within the second window based on the second normalization parameter independently of each of the other windows of the plurality of windows;

analyzing intensity values of the fingerprint image with the electronics device;

determining feature information based on the analyzing with the electronics device;

comparing the feature information to the template with the electronics device;

discarding, by the electronics device, the template fingerprint image after the obtaining the template feature information and before the comparing;

determining with the electronics device whether to authenticate a user associated with the fingerprint image based on the comparing; and outputting from the electronics device a message indicating whether the user is determined to be authenticated.

14. The method of claim 13, wherein the determining the feature information comprises identifying key points within the fingerprint image and defining feature descriptors that describe the identified key points.

15. The method of claim 14, further comprising counting a number of the feature descriptors that match feature descriptors in the template.

16. The method of claim 14, further comprising:
for one of the feature descriptors, determining a set of intensity values for adjacent pixels surrounding one of the identified key points, wherein the comparing comprises comparing the set of intensity values to the template; and
determining whether the one feature descriptor matches a feature descriptor indicated by the template based on the comparing the set of intensity values to the template.

17. The method of claim 13, further comprising:
detecting a plurality of key points in the fingerprint image;
for each of the plurality of key points, defining a feature descriptor that includes intensity values from pixels adjacent to the key point, thereby defining a plurality of feature descriptors; and
wherein the comparing comprises comparing the plurality of feature descriptors to the template.

18. The method of claim 17, further comprising:
determining a score based on a number of the plurality of feature descriptors that respectively match feature descriptors in the template; and
comparing the score to a threshold,
wherein the determining whether to authenticate the user is based on the comparing the score to the threshold.

19. The method of claim 13, wherein the performing, the analyzing, the determining the feature information, the comparing, and the determining whether to authenticate the user are performed by at least one processor of the electronics device.

20. An electronics device for performing touchless fingerprint authentication, comprising:
memory for storing a template indicative of a fingerprint, wherein the template includes template feature information obtained from a template fingerprint image;
a camera configured to capture a fingerprint image of a finger while the finger is positioned away from the camera by a distance; and
at least one processor configured to perform localized normalization on the fingerprint image for compensating for varying lighting conditions across a surface of the finger, the at least one processor configured to analyze intensity values of the fingerprint image for determining feature information indicative of fingerprint features in the fingerprint image, the at least one processor further configured to compare the feature information to the template for determining whether the feature information matches the template and to determine whether to authenticate a user associated with the fingerprint image based on whether the feature information is determined to match the template, wherein the at least one processor is configured to detect a plurality of key points in the fingerprint image, wherein the at least one processor for each of the plurality of key points is configured to characterize the key point by defining a feature descriptor that includes intensity values from pixels adjacent to the key point, thereby defining a plurality of feature descriptors for the key points, wherein the feature information includes the plurality of feature descriptors, wherein the at least one processor is configured to compare the plurality of feature descriptors to the template, wherein the at least one processor is configured to determine a score based on a number of the plurality of feature descriptors that respectively match feature descriptors in the template, wherein the at least one processor is configured to compare the score to a threshold, wherein the at least one processor is configured to authenticate the user based on a comparison of the score to the threshold, wherein the template fingerprint image is discarded by the at least one processor after obtaining the template feature information from the template fingerprint image and before comparing the feature information to the template, and wherein the at least one processor in performing the localized normalization is configured to:

segment the fingerprint image into a plurality of overlapping windows, including at least a first window and a second window that overlaps with the first window;
determine a first normalization parameter based on intensity values within the first window;
determine a second normalization parameter based on intensity values within the second window;
adjust the intensity values within the first window based on the first normalization parameter independently of each of the other windows of the plurality of overlapping windows; and
adjust the intensity values within the second window based on the second normalization parameter independently of each of the other windows of the plurality of overlapping windows.

* * * * *